(12) United States Patent
Barrass et al.

(10) Patent No.: US 7,154,845 B1
(45) Date of Patent: Dec. 26, 2006

(54) METHOD AND SYSTEM FOR MEASURING CROSSTALK UTILIZING A CROSSBAR SWITCH

(75) Inventors: Hugh Barrass, Milpitas, CA (US); Scott M. Simon, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 993 days.

(21) Appl. No.: 10/138,468

(22) Filed: May 3, 2002

(51) Int. Cl.
*H04J 1/12* (2006.01)
(52) U.S. Cl. ...................... 370/201; 379/417
(58) Field of Classification Search .......... None
See application file for complete search history.

(56) References Cited

U.S. PATENT DOCUMENTS

| | | | | |
|---|---|---|---|---|
| 4,567,462 A | | 1/1986 | Leiby | 340/347 P |
| 4,660,021 A | | 4/1987 | Leiby | 340/347 P |
| 4,977,376 A | | 12/1990 | Schiek et al. | 324/613 |
| 5,483,551 A | * | 1/1996 | Huang et al. | 375/219 |
| 5,502,391 A | | 3/1996 | Sciacero et al. | 324/628 |
| 5,539,321 A | | 7/1996 | Sciacero et al. | 324/628 |
| 5,751,152 A | * | 5/1998 | DuBose et al. | 324/628 |
| 6,160,790 A | * | 12/2000 | Bremer | 370/201 |
| 6,611,595 B1 | | 8/2003 | Leckschat et al. | 379/417 |
| 6,647,067 B1 | | 11/2003 | Hjelm et al. | 375/260 |
| 2004/0218756 A1 | * | 11/2004 | Tang et al. | 379/417 |

* cited by examiner

*Primary Examiner*—Duc Ho
(74) *Attorney, Agent, or Firm*—Baker Botts L.L.P.

(57) ABSTRACT

A method for measuring crosstalk in a data service system includes transmitting a signal using a first device. The first device is coupled to a solid state crossbar switch. The method includes coupling the first device using the crossbar switch to a first data line coupled to the crossbar switch such that the signal communicates over the first data line. The first data line is capable of being coupled to a customer premise equipment (CPE) device. The method includes coupling a first number of second devices coupled to the crossbar switch to a second number of data lines coupled to the crossbar switch using the crossbar switch. Each second number of data lines is capable of being coupled to a CPE device. The method also includes monitoring the second number of data lines for near end crosstalk (NEXT) generated by the signal communicating over the first data line using the first number of second devices. The method may also include monitoring at least one of a third number of data lines for far end crosstalk (FEXT) generated by a signal communicating over the third number of data lines. The third number of data lines comprises the first data line and the second number of data lines.

43 Claims, 2 Drawing Sheets

METHOD AND SYSTEM FOR MEASURING CROSSTALK UTILIZING A CROSSBAR SWITCH

TECHNICAL FIELD OF THE INVENTION

This invention relates in general to the field of data communications and, more particularly, to a system for measuring crosstalk utilizing a crossbar switch.

BACKGROUND OF THE INVENTION

The recent growth of the Internet has increased the demand for bandwidth. Digital subscriber line (DSL) technology meets this demand by providing higher bandwidth data service over existing twisted pair telephone lines. DSL technology achieves the higher data transmission rates by taking advantage of unused frequencies, which are significantly higher than voice band frequencies, on the existing twisted pair lines.

DSL systems typically include multiple bundles of twisted pair wires that may be located within close proximity of each other. Communication occurring on one wire may degrade or substantially interrupt communication on an adjacent wire by causing crosstalk on the adjacent wire. DSL systems typically can suffer from two different types of crosstalk. Far end crosstalk generally occurs between signals being transmitted at the same time and in the same direction on two adjacent wires. Far end crosstalk typically may not be avoided and may only limit the speed of communication in the system. In contrast, near end crosstalk generally occurs between signals on adjacent lines being transmitted at the same time but in opposite directions. Near end crosstalk, however, has a more detrimental effect on communication in the system and may even destroy weak line communication if it is not eliminated.

SUMMARY OF THE INVENTION

The present invention provides a system for measuring crosstalk utilizing a crossbar switch that substantially eliminates or reduces at least some of the disadvantages and problems associated with previous systems for measuring crosstalk.

In accordance with a particular embodiment of the present invention, a method for measuring crosstalk in a data service system includes transmitting a signal using a first device. The first device is coupled to a solid state crossbar switch. The method includes coupling the first device using the crossbar switch to a first data line coupled to the crossbar switch such that the signal communicates over the first data line. The first data line is capable of being coupled to a customer premise equipment (CPE) device. The method includes coupling a first number of second devices coupled to the crossbar switch to a second number of data lines coupled to the crossbar switch using the crossbar switch. Each second number of data lines is capable of being coupled to a CPE device. The method also includes monitoring the second number of data lines for near end crosstalk (NEXT) generated by the signal communicating over the first data line using the first number of second devices. The method may include calculating a far end crosstalk (FEXT) measurement based upon a NEXT measurement.

In accordance with another embodiment, a system for measuring crosstalk in a data service system includes a first device operable to transmit a signal and a solid state crossbar switch coupled to the first device. The system includes a first data line coupled to the crossbar switch. The first data line is capable of being coupled to a customer premise equipment (CPE) device, and the crossbar switch is operable to couple the first device to the first data line such that the signal communicates over the first data line. The system also includes a first number of second devices coupled to the crossbar switch and a second number of data lines coupled to the crossbar switch. Each second number of data lines is capable of being coupled to a CPE device. The crossbar switch is further operable to couple the first number of second devices to the second number of data lines, and the first number of second devices are operable to monitor the second number of data lines for near end crosstalk (NEXT) generated by the signal communicating over the first data line. A far end crosstalk (FEXT) measurement may be calculated based on a measurement of the NEXT.

Technical advantages of particular embodiments of the present invention include a crosstalk measurement system with a solid state crossbar switch that couples transmitters and receivers to data lines of a data service system. The measurement system can measure crosstalk on each data line without having to manually or mechanically couple the transmitters and receivers to the data lines. Accordingly, crosstalk can be quickly measured in the data service system.

Another technical advantage of particular embodiments of the present invention includes a crosstalk measurement system that can measure crosstalk on each data line of a data service system in both an upstream band and a downstream band. The crosstalk measurements may be taken before the system is placed in operation and without having to take measurements at the subscriber end of the data service system. Accordingly, the time and expenses associated with measuring crosstalk in the data service system can be reduced.

Yet another technical advantage of particular embodiments of the present invention includes a crosstalk measurement system through which an accurate estimation of FEXT may be obtained. Such estimation may be obtained by installing a CPE device at an endpoint of one or more data line without requiring the installation of a CPE device at an endpoint of each data line.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
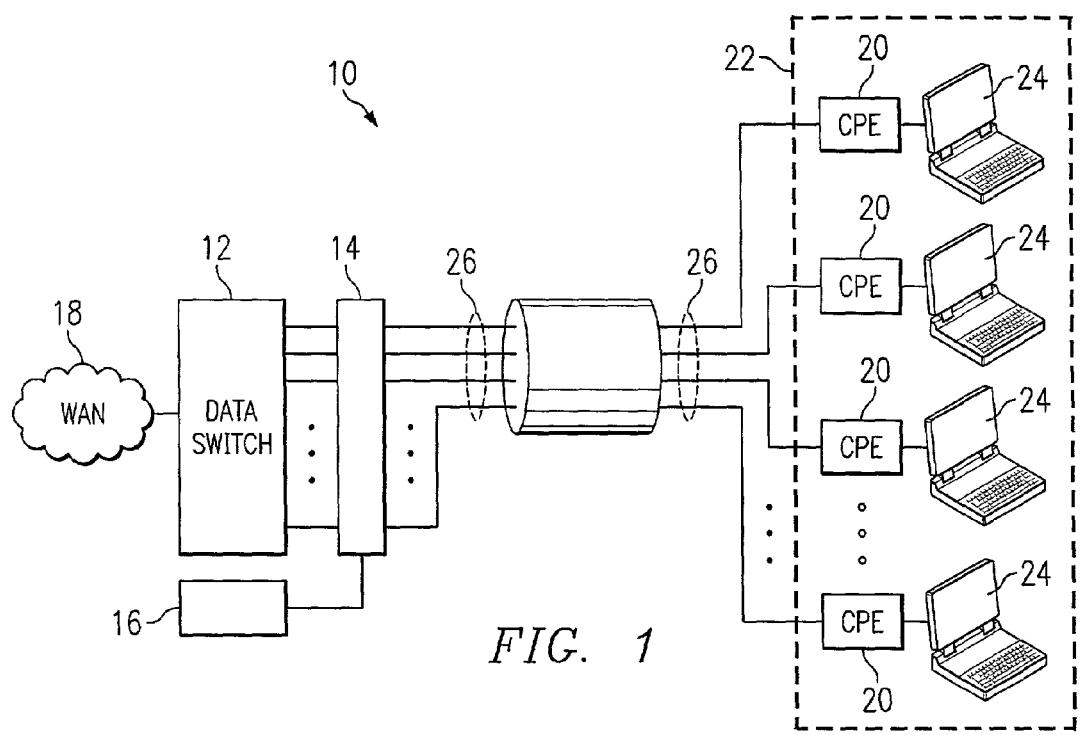
FIG. 1 illustrates a system for measuring crosstalk in a data service system, in accordance with an embodiment of the present invention.

FIG. 1 illustrates a system 10 for measuring crosstalk in a system providing data services, in accordance with an embodiment of the present invention. System 10 is a data service system that may provide data services, such as long reach Ethernet (LRE) service, for a subscriber community 22, which may include one or more businesses, apartment complexes or other communities in which one or more subscribers share communications infrastructure or resources, such as a crossbar switch 14. Each subscriber in subscriber community 22 may access data services using one or more associated personal computers (PCs) 24, as illustrated, or other suitable devices, such as telephones or televisions, for interfacing with a data network, such as wide area network (WAN) 18.

System 10 includes a solid state crossbar switch 14 which couples a data switch 12 with customer premise equipment (CPE) devices 20. Data lines 26 couple crossbar switch 14 to CPE devices 20. Data switch 12 is linked to WAN 18 and may be a DSLAM unit or other device for routing or aggregating data traffic communicated between WAN 18 and PCs 24. For purposes of this specification, "data" includes any audio, video, multimedia, telecommunication signals or other type of data or other wideband or broadband calls, traffic or other signals that may be communicated between WAN 18 and PCs 24. In particular embodiments, data switch 12 may be any type of switch providing digital subscriber line (DSL) service (DSL switch), such as a very high speed DSL (VDSL) switch.

Since crossbar switch 14 is a "solid state" crossbar switch, it uses silicon transistor technology. Therefore, its switching time may be faster and its working life may be longer than that of mechanical relay-based switches. For example, the switching time of crossbar switch 14 may be approximately one switch per millisecond.

System 10 includes a testing device 16 which aids in measuring crosstalk in the system. Testing device 16 is coupled to crossbar switch 14. Crossbar switch 14 is operable to couple testing device 16 to any data line 26. In the illustrated embodiment, testing device 16 is illustrated as a separate device from data switch 12; however, in other embodiments data switch 12 may include testing device 16. Testing device 16 transmits a signal which may be communicated to any data line 26 to which it is coupled in order to measure near end crosstalk (NEXT) or far end crosstalk (FEXT) in the system.

Using testing device 16, NEXT may be measured for each data line with respect to NEXT occurring on the other, adjacent data lines. Using testing device 16, FEXT may be measured for each data line coupled to a CPE device. The NEXT and FEXT measurements may be combined with attenuation measurements in order to calculate signal-to-noise ratios for the system. The NEXT measurements may also be used to estimate FEXT for each data line for which direct FEXT measurements may not be available with respect to FEXT occurring on the other, adjacent data lines.

Once these measurements are obtained for the system, a data service provider can determine what level of service the provider can provide through the system (for example, the level of service which may be guaranteed as the subscriber community increases to maximum capacity). For example, depending on a signal-to-noise ratio, a provider may be able to provide data service at five or ten megabytes per second per data line. Knowing the level of service that may be provided with a particular data service system can enable a data service provider to attract new customers seeking a particular service level without degradation to existing customers.

Figure 2:
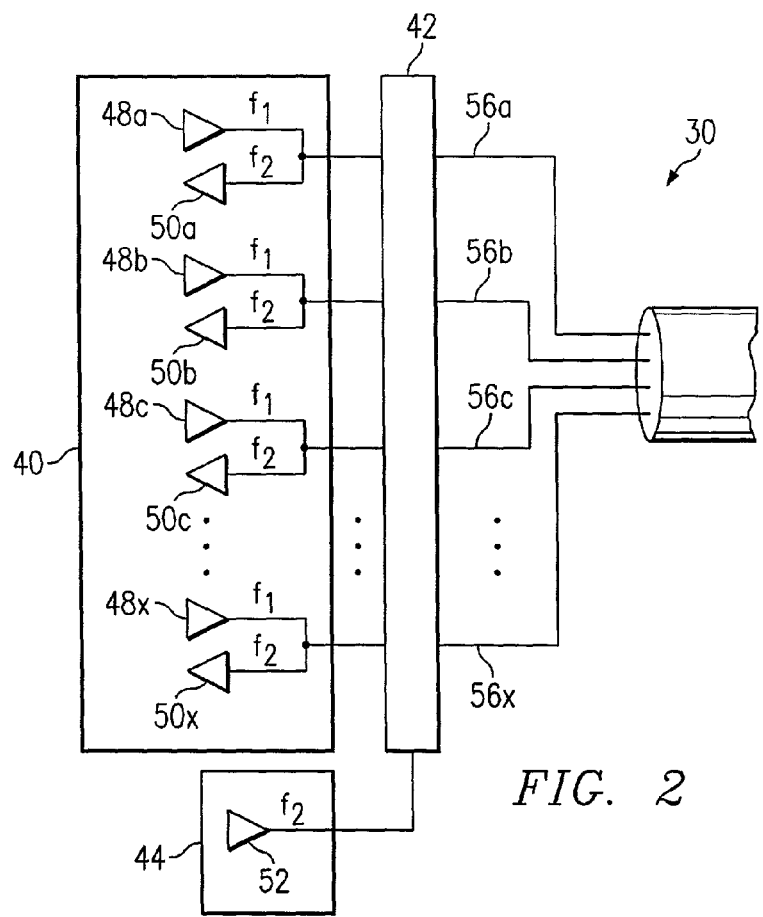
FIG. 2 illustrates a system for measuring crosstalk using a testing device and a solid state crossbar switch, in accordance with an embodiment of the present invention.

FIG. 2 illustrates a system 30 for measuring crosstalk, in accordance with an embodiment of the present invention. System 30 includes a data switch 40 coupled to a solid state crossbar switch 42. Some embodiments of the present invention may integrate data switch 40 and crossbar switch 42 into the same device. Data switch 40 includes transmitters 48 and receivers 50. Transmitters 48 and receivers 50 include circuitry able to monitor and detect crosstalk from adjacent lines. As illustrated, each transmitter 48 has an associated receiver 50. For example, transmitter 48a is associated with receiver 50a, and transmitter 48b is associated with receiver 50b. System 30 includes data lines 56 coupled to crossbar switch 42. Data lines 56 may be coupled to CPE devices of a subscriber community. The illustrated embodiment includes 24 transmitters 48, 24 receivers 50 and 24 data lines 56. Other embodiments of the present invention may include different numbers of transmitters, receivers and data lines. For example, some embodiments may include 25 data lines 56.

System 30 may be used to measure and/or estimate NEXT and/or FEXT either before or after the system has been coupled to a subscriber community.

Each data line 56 comprises a "twisted pair" of wires used to carry data transmitted by transmitters 48 in a downstream band, frequency $f_1$, and data received by receivers 50 in an upstream band, frequency $f_2$. The downstream frequency $f_1$ of each data line 46 is coupled to a transmitter 48, and the upstream frequency $f_2$ of each data line 46 is coupled to a receiver 50. Data lines 56 may be unshielded twisted pair (UTP), shielded twisted pair (STP) or other suitable type or category of twisted pair wiring made of copper or any other suitable conductive material.

A testing device 44 is coupled to crossbar switch 42. Testing device 44 includes a transmitter 52 which transmits data in upstream band, frequency $f_2$. Crossbar switch 42 is operable to couple transmitter 52 or any associated transmitter/receiver pairs 48/50 to any data line 56. For example, crossbar switch 42 may couple associated transmitter/receiver pairs 48a/50a–48w/50w to data lines 56a–56w, respectively, and transmitter 52 to data line 56x. In particular embodiments, data switch 40 and testing device 44 may be integrated into the same device.

In order to test NEXT for a particular data line 56 of system 30, transmitter 52 is coupled to the particular data line 56 being tested using crossbar switch 42 such that data transmitted by transmitter 52 may be communicated over the particular data line 56 being tested. Assume, for example, transmitter 52 is coupled to data line 56a. All but one of transmitter/receiver pairs 48/50 are coupled to all other data lines 56 (data lines 56b–56x) using crossbar switch 42. In this case, transmitter/receiver pairs 48a/50a–48w/50w may be coupled to data lines 56b–56x, respectively. A signal is transmitted by transmitter 52 over data line 56a. Receivers 50a–50w monitor and detect any NEXT which occurs on data lines 56b–56x from the transmission over adjacent data line 56a. Any such NEXT that occurs on data lines 56b–56x is measured and summed to give a PowerSum NEXT measurement for data line 56a. Since transmitter 52 transmits in upstream band $f_2$ and receivers 50 receive in upstream band $f_2$, then the PowerSum NEXT measurement obtained in the manner described for data line 56a will apply to data communicated in upstream band $f_2$.

A PowerSum NEXT measurement for another data line may then be obtained. This is accomplished in a similar manner as described above with respect to data line 56a. Assume, for example, NEXT over data line 56b will now be tested. Transmitter 52 is coupled to data line 56b using crossbar switch 42. All but one of transmitter/receiver pairs 48/50 are coupled to all other data lines 56 (data lines 56a and 56c–56x). In this case, transmitter/receiver pairs 48a/50a–48w/50w may be coupled to data lines 56a and 56c–56x, respectively. A signal is transmitted by transmitter 52 over data line 56b. Receivers 50a–50w monitor and detect any NEXT which occurs on data lines 56a and 56c–56x from the transmission over adjacent data line 56b. Any such NEXT that occurs on data lines 56a and 56c–56x is measured and summed to give a PowerSum NEXT measurement for data line 56b. Since transmitter 52 transmits in upstream band $f_2$ and receivers 50 receive in upstream band $f_2$, then the PowerSum NEXT measurement obtained in the manner described for data line 56b will apply to data communicated in upstream band $f_2$.

The processes described above for obtaining PowerSum NEXT measurements for data lines 56a and 56b may be used to obtain PowerSum NEXT measurements for communications in upstream band $f_2$ over the other data lines (data lines 56c–56x). The PowerSum NEXT measurements obtained may be used to extrapolate PowerSum NEXT measurements for communications in downstream bank $f_1$ over data lines 56 using the relationship between upstream band $f_2$ and downstream band $f_1$.

Since system 30 includes a solid state crossbar switch 42, the couplings between transmitter 52, transmitter/receiver pairs 48/50 and data lines 56 may be made and switched quickly. This enables a data service provider to measure NEXT for communications over each data line very quickly, without having to manually or mechanically switch the couplings in order to measure NEXT on different data lines. Thus, time and expense associated with measuring NEXT for the data service system can be reduced.

After all such NEXT measurements are taken, one can determine the particular transmitter/receiver pair 48/50 that produces the worst, or most, NEXT when data flows through data lines 46 of system 30.

Attenuation may be measured on system 30 using any of a variety of methods known to one skilled in the art. Attenuation is the weakening of a signal being communicated and is related to the distance that the signal must travel over a data line. The attenuation may be measured with respect to the furthest point that a data line 56 extends from crossbar switch 42 in order to get a worst case measurement for attenuation. Attenuation may also be estimated based upon an attenuation measurement taken at a particular point along a particular data line 56 and the distance that the particular data line 56 extends from crossbar switch 42. The attenuation measurements may be taken before or after system 30 has been coupled to a subscriber community.

Using the worst case NEXT and attenuation measurements, the worst case attenuation to crosstalk ratio (ACR) (or signal-to-noise ratio) may be calculated. The ACR ratio is equal to the near end crosstalk loss divided by the attenuation in the band of transmission. The ACR is a measure of the maximum possible signal-to-noise ratio available to NEXT-limited methods of communication. The performance of LRE is limited by FEXT.

If it is possible to attach at least one CPE device at a far point of a data line 56, then the FEXT may be measured in the downstream band for such data line. For example, to measure the FEXT for data line 56a, a CPE device is coupled to a far point of data line 56a. Transmitter 48a transmits a signal, and the strength of the signal received at the CPE device coupled to data line 56a is measured. Then, transmitters 48b–48x each transmit a signal over their respective data lines 56, and the strength of the signal received at the CPE device coupled to data line 56a is measured. The difference between these two measurements taken at the CPE device coupled to data line 56a corresponds to the PowerSum FEXT. FEXT may be measured in this manner for any number of data lines 56. If FEXT is not directly measured for any of data lines 56, then it may be calculated based upon any FEXT measurements for any other data lines 56 and on direct NEXT measurements.

FEXT for the upstream frequency $f_2$ and for the data lines not available for direct FEXT measurement may be estimated based upon measured NEXT and FEXT values using any of a number of algorithms. One pair of algorithms which may be used to estimate FEXT based on NEXT in particular embodiments is the following:

$$-K_{next}+20.\log(f) \tag{1}$$

$$-K_{fext}+20.\log(f)+10.\log(d), \tag{2}$$

where f=frequency of transmission and d=distance (or length of transmission). Given the value of NEXT with frequency, it is possible to estimate the value of FEXT with frequency and distance. If NEXT and FEXT measurements are available, then the relative values of $K_{next}$ and $K_{fext}$ may be determined. Otherwise, $K_{fext}$ may be estimated based upon assumptions regarding the type of installation.

Figure 3:
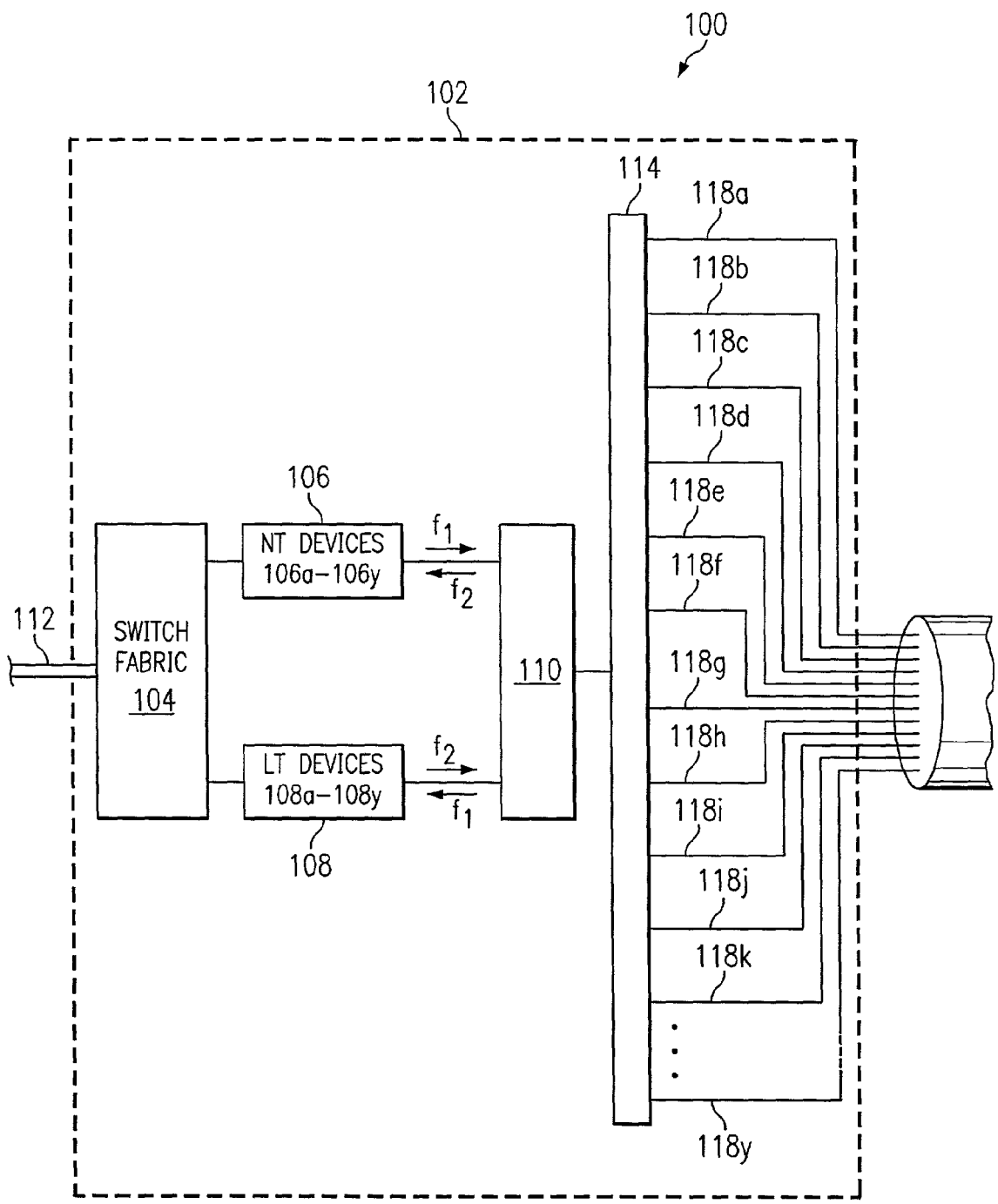
FIG. 3 illustrates a system for measuring crosstalk with network termination and line termination devices and a solid state crossbar switch, in accordance with an embodiment of the present invention.

FIG. 3 illustrates a system 100 for measuring crosstalk in accordance with an embodiment of the present invention. System 100 includes a measurement device 102. Measurement device 102 includes switch fabric 104, network termination (NT) devices 106, line termination (LT) devices 108, solid state crossbar switch 110 and connector 114. Measurement device 102 may be used to measure crosstalk in a data service system. Measurement device 102 may be used to measure the crosstalk in the data service system by coupling the device using uplinks 112 to a WAN or other network or network equipment before a data switch for the data service system has been installed. The crosstalk may also be measured before CPE devices of a subscriber community have been coupled to the data service system.

NT devices 106 are operable to transmit a signal in a downstream band, frequency $f_1$, and receive a signal in an upstream band, frequency $f_2$. LT devices 108 are operable to transmit a signal in the upstream band, frequency $f_2$, and receive a signal in the downstream band, frequency $f_1$. NT devices 106 and LT devices 108 also include circuitry able to monitor and detect crosstalk from adjacent data lines. In the illustrated embodiment, measurement device 102 has 24 NT devices 106 (NT devices 106a–106x) and 24 LT devices 108 (LT devices 108a–108x); however, measurement devices in accordance with other embodiments may have a different number of NT devices and a different number of LT devices.

Connector 114 couples crossbar switch 110 to data lines 118. Data lines 118 are operable to be coupled to CPE devices of a subscriber community. Each data line 118 comprises a twisted pair of wires such that each data line 118 includes a wire for carrying data in downstream band $f_1$ and a wire for carrying data in upstream band $f_2$. In this embodiment, there are 25 data lines 118 (data lines 118a–118y); however, other embodiments of the present invention may include another number of data lines.

NT devices 106 and LT devices 108 are coupled to crossbar switch 110. Crossbar switch 114 is operable to couple any of NT devices 106 and/or LT devices 108 to any data line 118 coupled to connector 114. For example, crossbar switch may couple LT device 108a to data line 118a while coupling NT devices 106a–106x to data lines 118b–118y, respectively. Since crossbar switch 114 is a solid state crossbar switch, couplings between NT devices 106 and LT devices 108 and data lines 118 may be made and switched quickly.

In operation, measurement device 102 is coupled to data lines 118 through connector 114. In this embodiment, data lines 118 are not yet coupled to a subscriber community, but in other embodiments the data lines may already be coupled to a subscriber community when crosstalk is measured. Using measurement device 102, NEXT may be measured for communications in both downstream band $f_1$ and upstream band $f_1$ of the data service system.

In order to measure NEXT over downstream band $f_1$, one NT device 106 is coupled to one data line 118 using crossbar switch 110. Assume, for example, that an NT device 106 is coupled to data line 118a. Each LT device 108 is coupled to the remaining data lines 118 using crossbar switch 110. In this case LT devices 108a–108x may be coupled to data lines 118b–118y, respectively. The NT device 106 coupled to data line 118a transmits a signal over data line 118a in downstream band $f_1$. Since LT devices 108 receive signals in downstream band $f_1$, LT devices 108a–108x monitor and detect any NEXT which occurs on data lines 118b–118y from the transmission over adjacent data line 118a. Any such NEXT that occurs on data lines 118b–118y is measured and summed to give a PowerSum NEXT measurement for communications in downstream band $f_1$ over data line 118a.

Then a PowerSum NEXT measurement is obtained for downstream band $f_1$ over another data line 118, for example, data line 118b. This is accomplished in a similar manner as described above with respect to data line 118a. For example, an NT device 106 is coupled to data line 118b using crossbar switch 114. LT devices 108a–108x are coupled to each other data line (data lines 118a and 118c–118y, respectively). The NT device 106 coupled to data line 118b transmits a signal over data line 118b in downstream band $f_1$. LT devices 108a–108x monitor and detect any NEXT which occurs on data lines 118a and 118c–118y from the transmission over adjacent data line 118b. Any such NEXT that occurs on data lines 118a and 118c–118y is measured and summed to give a PowerSum NEXT reading for communications in downstream band $f_1$ over data line 118b.

The processes described above for obtaining PowerSum NEXT measurements for communications in downstream band $f_1$ over data lines 118a and 118b may be used to obtain PowerSum NEXT readings for communications in downstream band $f_1$ over the other data lines (data lines 118c–118y).

Since NEXT measurements have been obtained for communications in downstream band $f_1$ over each data line 118, measurement device 102 may then be used to obtain NEXT measurements for communications in upstream band $f_2$ over data lines 118. In order to measure NEXT for upstream band $f_2$, one LT device 108 is coupled to one data line 118 using crossbar switch 110. Assume, for example, that an LT device 108 is coupled to data line 118a. Each NT device 106 is coupled to the remaining data lines 118 using crossbar switch 110. In this case NT devices 106a–106x may be coupled to data lines 118b–118y, respectively. The LT device 108 coupled to data line 118a transmits a signal over data line 118a in upstream band $f_2$. Since NT devices 106 receive signals in upstream band $f_2$, NT devices 106a–106x monitor and detect any NEXT which occurs on data lines 118b–118y from the transmission over data line 118a. Any such NEXT that occurs on data lines 118b–118y is measured and summed to give a PowerSum NEXT measurement for communications in upstream band $f_2$ over data line 118a.

Then a PowerSum NEXT measurement is obtained for communications in upstream band $f_2$ over another data line 118, for example, data line 118b. This is accomplished in a similar manner as described above with respect to data line 118a. For example, an LT device 108 is coupled to data line 118b using crossbar switch 110. NT devices 106a–106x are coupled to each other data line (data lines 118a and 118c–118y, respectively) The LT device 108 coupled to data line 118b transmits a signal over data line 118b in upstream band $f_2$. NT devices 106a–106x monitor and detect any NEXT which occurs on data lines 118a and 118c–118y from the transmission over data line 118b. Any such NEXT that occurs on data lines 118a and 118c–118y is measured and summed to give a PowerSum NEXT reading for communications in upstream band $f_2$ over data line 118b.

The processes described above for obtaining PowerSum NEXT measurements for communications in upstream band $f_2$ over data lines 118a and 118b may be used to obtain PowerSum NEXT readings for communications in upstream band $f_2$ over the other data lines (data lines 118c–118y). Attenuation in the system may also be measured as discussed above with respect to FIG. 2. Similarly, measurements for ACR, FEXT and ELFEXT may be obtained for the data service system as well.

Direct FEXT measurement may also be obtained for any number of data lines 118 in a similar manner as described above with respect to FIG. 2. In such case, CPE devices may be coupled to the far ends of the data lines 118 for which direct FEXT measurements are desired. A signal may be transmitted over all data lines 118 and FEXT may be directly measured at the CPE devices. Direct FEXT measurements may be obtained either for both frequencies $f_1$ and $f_2$ or for just one frequency and calculated for the other frequency based on both the FEXT measurements for the first frequency and on NEXT measurements obtained for the other frequency for all data lines 118. When direct FEXT measurements are obtained for less than all of data lines 118, FEXT calculations may be made for the remaining data lines 118 based on direct FEXT measurements obtained and the NEXT measurements obtained for all data lines 118.

Measurement device 102 enables a data service provider to measure crosstalk occurring on data lines 118 for communication in both downstream band $f_1$ and upstream band $f_2$. Crosstalk measurements for all data lines may be made quickly since crossbar switch 114 is able to automatically switch couplings between NT/LT devices 106/108 and data lines 118 without manual or mechanical coupling and switching.

Such crosstalk can be measured without having to take measurements at the subscriber end of the data service system. This can save both time and expense. Furthermore, since the crosstalk may be measured before a subscriber community has been installed, a data service provider may become aware of any potential crosstalk problems with the data service system, and may be able to correct such problems, before the system is placed in operation.

Although the present invention has been described in detail, various changes and modifications may be suggested to one skilled in the art. It is intended that the present invention encompass such changes and modifications as falling within the scope of the appended claims.

What is claimed is:

1. A method for measuring crosstalk in a data service system, comprising:
   transmitting a signal using a testing transmitter, the testing transmitter coupled to a solid state crossbar switch;
   coupling the testing transmitter using the crossbar switch to a first data line coupled to the crossbar switch such that the signal communicates over the first data line, the first data line coupled to a customer premise equipment (CPE) device;
   coupling a first number of a second number of receivers coupled to the crossbar switch to a plurality of data lines coupled to the crossbar switch using the crossbar switch, each of the plurality of data lines coupled to a CPE device; and
   monitoring the plurality of data lines for near end crosstalk (NEXT) generated by the signal communicating over the first data line using the first number of receivers, wherein the signal is transmitted in a first frequency, wherein each receiver is operable to receive data in the first frequency and wherein each receiver has an associated transmitter operable to transmit data in a second frequency.

2. The method of claim 1, further comprising calculating a NEXT measurement for the first data line.

3. The method of claim 2, further comprising measuring attenuation of a signal on a data line.

4. The method of claim 3, further comprising calculating an attenuation to crosstalk ratio based upon the NEXT measurement and the attenuation.

5. The method of claim 3, further comprising calculating a far end crosstalk (FEXT) measurement based upon the NEXT measurement.

6. The method of claim 5, further comprising measuring attenuation of a signal on a data line.

7. The method of claim 6, further comprising calculating an equal level FEXT based upon the FEXT measurement and the attenuation.

8. The method of claim 1, further comprising:
   coupling each of at least one of the plurality of data lines to a respective CPE device;
   transmitting a signal in a first frequency over the plurality of data lines;
   monitoring the at least one of the plurality third number of data lines for far end crosstalk (FEXT) generated by the signal communicating over the plurality of data lines; and
   calculating a FEXT measurement for the first frequency for the at least one of the plurality of data lines.

9. The method of claim 8, further comprising calculating a FEXT measurement for a second frequency for the at least one of the plurality of data lines based on the FEXT measurement for the first frequency for the at least one of the plurality of data lines and the monitored NEXT.

10. The method of claim 9, further comprising calculating a FEXT measurement for the plural of data lines not included in the at least one of the plurality of data lines based upon the FEXT measurements for the at least one of the plurality of data lines and the monitored NEXT.

11. The method of claim 1, wherein the first number of receivers is twenty-three and the second number of receivers is twenty-four.

12. A method for measuring crosstalk in a data service system, comprising:
   transmitting a signal using a first device, the first device coupled to a solid state crossbar switch;
   coupling the first device using the crossbar switch to a first data line coupled to the crossbar switch such that the signal communicates over the first data line, the first data line is capable of being coupled to a customer premise equipment (CPE) device;
   coupling a first number of second devices coupled to the crossbar switch to a second number of data lines coupled to the crossbar switch using the crossbar switch, each second number of data lines coupled to a CPE device; and
   monitoring the second number of data lines for near end crosstalk (NEXT) generated by the signal communicating over the first data line using the first number of second devices, wherein the first device comprises a line termination (LT) device, the LT device operable to transmit data in a first frequency and receive data in a second frequency, wherein the second devices comprise network termination (NT) devices, the NT devices operable to transmit data in the second frequency and receive data in the first frequency.

13. The method of claim 12, wherein the first device comprises a network termination (NT) device, the NT device operable to transmit data in a first frequency and receive data in a second frequency.

14. The method of claim 13, wherein the second devices comprise line termination (LT) devices, the LT devices operable to transmit data in the second frequency and receive data in the first frequency.

15. The method of claim 12, further comprising calculating a NEXT measurement for the first data line.

16. The method of claim 15, further comprising measuring attenuation of a signal on a data line.

17. The method of claim 16, further comprising calculating an attenuation to crosstalk ratio based upon the NEXT measurement and the attenuation.

18. The method of claim 15, further comprising calculating a far end crosstalk (FEXT) measurement based upon the NEXT measurement.

19. The method of claim 18, further comprising measuring attenuation of a signal on a data line.

20. The method of claim 19, further comprising calculating an equal level FEXT based upon the FEXT measurement and the attenuation.

21. The method of claim 12, further comprising:
   coupling each of at least one of a plurality of data lines to a respective CPE device, wherein the plurality of data lines comprises the first data line and the second number of data lines;
   transmitting a signal in a first frequency over the plurality of data lines;
   monitoring the at least one of the plurality of data lines for far end crosstalk (FEXT) generated by the signal communicating over the plurality of data lines; and
   calculating a FEXT measurement for the first frequency for the at least one of the plurality of data lines.

22. The method of claim 21, further comprising calculating a FEXT measurement for a second frequency for the at least one of the plurality of data lines based on the FEXT measurement for the first frequency for the at least one of the plurality of data lines and the monitored NEXT.

23. The method of claim 22, further comprising calculating a FEXT measurement for the plurality of data lines not included in the at least one of the plurality of data lines based upon the FEXT measurements for the at least one of the plurality of data lines and the monitored NEXT.

24. The method of claim 12, wherein the first number of second devices is twenty-four.

25. The method of claim 12, wherein the second number of data lines is twenty-four.

26. A system for measuring crosstalk in a data service system, comprising:
- a testing transmitter operable to transmit a signal;
- a solid state crossbar switch coupled to the testing transmitter;
- a first data line coupled to the crossbar switch, the first data line coupled to a customer premise equipment (CPE) device;
- wherein the crossbar switch is operable to couple the testing transmitter to the first data line such that the signal communicates over the first data line;
- a first number of a second number of receivers coupled to the crossbar switch;
- a plurality of data lines coupled to the crossbar switch, each of the plurality of data lines coupled to a CPE device;
- wherein the crossbar switch is further operable to couple the first number of receivers to the plurality of data lines; and
- wherein the first number of receivers are operable to monitor the plurality of data lines for near end crosstalk (NEXT) generated by the signal communicating over the first data line, wherein the signal is transmitted in a first frequency, wherein each receiver is operable to receive data in the first frequency and wherein each receiver has an associated transmitter operable to transmit data in a second frequency.

27. The system of claim 26, wherein the first number of receivers is twenty-three and the second number of receivers is twenty-four.

28. A system for measuring crosstalk in a data service system, comprising:
- a first device operable to transmit a signal;
- a solid state crossbar switch coupled to the first device;
- a first data line coupled to the crossbar switch, the first data line coupled to a customer premise equipment (CPE) device;
- the crossbar switch is operable to couple the first device to the first data line such that the signal communicates over the first data line;
- a first number of second devices coupled to the crossbar switch;
- a second number of data lines coupled to the crossbar switch, each second number of data lines coupled to a CPE device;
- the crossbar switch is further operable to couple the first number of second devices to the second number of data lines; and
- the first number of second devices are operable to monitor the second number of data lines for near end crosstalk (NEXT) generated by the signal communicating over the first data line, wherein the first device comprises a line termination (LT) device, the LT device operable to transmit data in a first frequency and receive data in a second frequency, wherein the second devices comprise network termination (NT) devices, the NT devices operable to transmit data in the second frequency and receive data in the first frequency.

29. The system of claim 28, wherein the first device comprises a network termination (NT) device, the NT device operable to transmit data in a first frequency and receive data in a second frequency.

30. The system of claim 29, wherein the second devices comprise line termination (LT) devices, the LT devices operable to transmit data in the second frequency and receive data in the first frequency.

31. The system of claim 28, wherein the first number of second devices is twenty-four.

32. The system of claim 28, wherein the second number of data lines is twenty-four.

33. An apparatus for measuring crosstalk in a data service system, comprising:
- means for transmitting a signal using a first device, the first device coupled to a solid state crossbar switch;
- means for coupling the first device using the crossbar switch to a first data line coupled to the crossbar switch such that the signal communicates over the first data line, wherein the first data line coupled to a customer premise equipment (CPE) device;
- means for coupling a first number of second devices coupled to the crossbar switch to a second number of data lines coupled to the crossbar switch using the crossbar switch, each second number of data lines coupled to a CPE device; and
- means for monitoring the second number of data lines for near end crosstalk (NEXT) generated by the signal communicating over the first data line using the first number of second devices, wherein the first device comprises a line termination (LT) device, the LT device operable to transmit data in a first frequency and receive data in a second frequency, wherein the second devices comprise network termination (NT) devices, the NT devices operable to transmit data in the second frequency and receive data in the first frequency.

34. The apparatus of claim 33, wherein the first device comprises a network termination (NT) device, the NT device operable to transmit data in a first frequency and receive data in a second frequency.

35. The apparatus of claim 34, wherein the second devices comprise line termination (LT) devices, the LT devices operable to transmit data in the second frequency and receive data in the first frequency.

36. The apparatus of claim 33, further comprising means for calculating a NEXT measurement for the first data line.

37. The apparatus of claim 36, further comprising means for calculating a far end crosstalk (FEXT) measurement based upon the NEXT measurement.

38. Logic encoded in media for measuring crosstalk in a data service system when executed by a computer causes the logic operable to:
- transmit a signal using a first device, the first device coupled to a solid state crossbar switch;
- couple the first device using the crossbar switch to a first data line coupled to the crossbar switch such that the signal communicates over the first data line, the first data line coupled to a customer premise equipment (CPE) device;
- couple a first number of second devices coupled to the crossbar switch to a second number of data lines coupled to the crossbar switch using the crossbar switch, each second number of data lines coupled to a CPE device; and
- monitor the second number of data lines for near end crosstalk (NEXT) generated by the signal communicating over the first data line using the first number of second devices, wherein the first device comprises a line termination (LT) device, the LT device operable to transmit data in a first frequency and receive data in a second frequency, wherein the second devices comprise network termination (NT) devices, the NT devices operable to transmit data in the second frequency and receive data in the first frequency.

39. The logic encoded in media of claim 38, wherein the first device comprises a network termination (NT) device, the NT device operable to transmit data in a first frequency and receive data in a second frequency.

40. The logic encoded in media of claim 39, wherein the second devices comprise line termination (LT) devices, the LT devices operable to transmit data in the second frequency and receive data in the first frequency.

41. The logic encoded in media of claim 38, wherein the logic is further operable to calculate a NEXT measurement for the first data line.

42. The logic encoded in media of claim 41, wherein the logic is further operable to calculate a far end crosstalk (FEXT) measurement based upon the NEXT measurement.

43. A method for measuring crosstalk in a data service system, comprising:

transmitting a signal using a first device, the first device is coupled to a solid state crossbar switch and the first device is operable to transmit data in a first frequency and receive data in a second frequency;

coupling the first device using the crossbar switch to a first data line coupled to the crossbar switch such that the signal communicates over the first data line, the first data line coupled to a customer premise equipment (CPE) device;

coupling twenty-four second devices coupled to the crossbar switch to twenty-four data lines coupled to the crossbar switch using the crossbar switch, each second number of data lines coupled to a CPE device and the second devices are operable to transmit data in the second frequency and receive data in the first frequency;

monitoring the twenty-four data lines for near end crosstalk (NEXT) generated by the signal communicating over the first data line using the second devices;

calculating a NEXT measurement for the first data line;

measuring attenuation of a signal on the first data line;

calculating an attenuation to crosstalk ratio based upon the NEXT measurement and the attenuation;

calculating a far end crosstalk (FEXT) measurement based upon the NEXT measurement; and calculating an equal level FEXT based upon the FEXT measurement and the attenuation.

* * * * *